(No Model.) 2 Sheets—Sheet 1.
G. H. WILLIAMS.
BICYCLE SUPPORT.
No. 588,542. Patented Aug. 17, 1897.
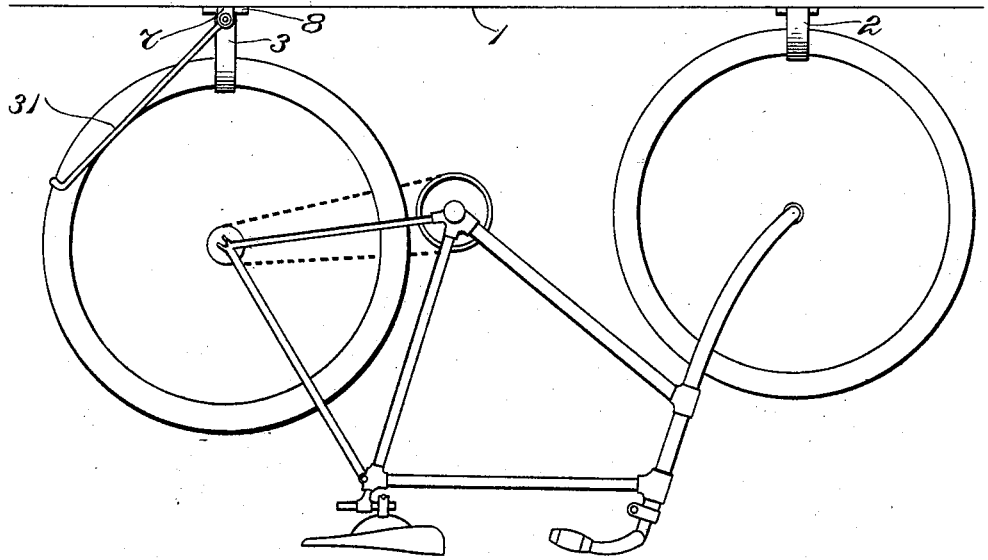
Fig. 1.
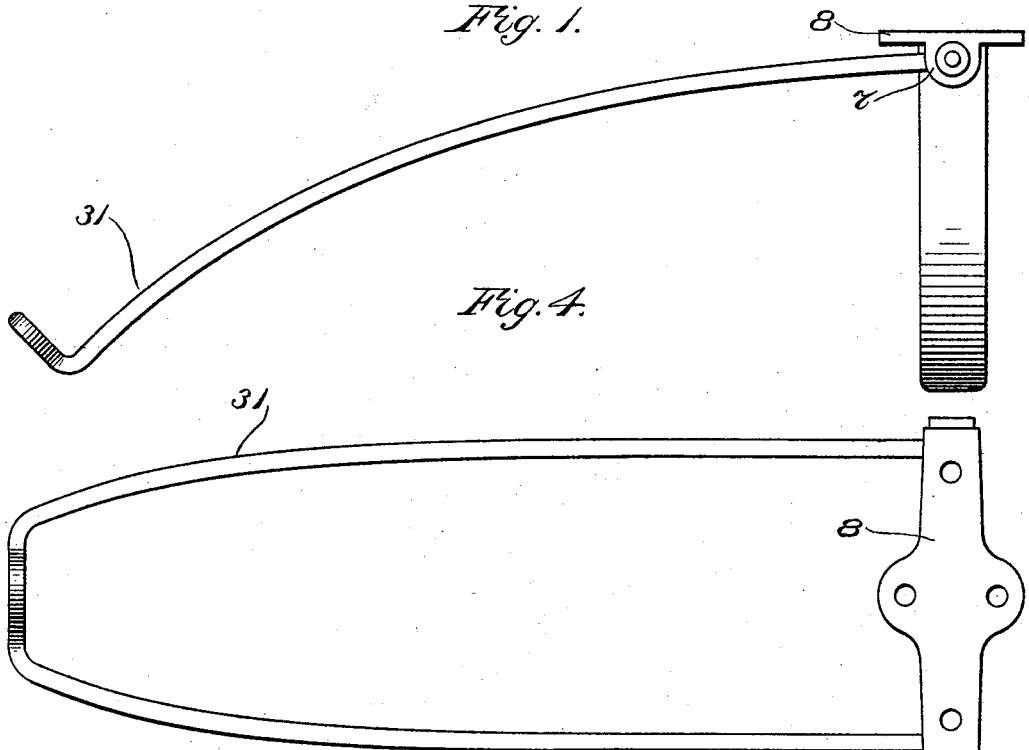
Fig. 4.
Fig. 5.
Witnesses:
Oscar F. Hill
Edith J. Anderson.
Inventor
George H. Williams
by Macleod Calvert Randall
Attorneys.

(No Model.) 2 Sheets—Sheet 2.
G. H. WILLIAMS.
BICYCLE SUPPORT.
No. 588,542. Patented Aug. 17, 1897.
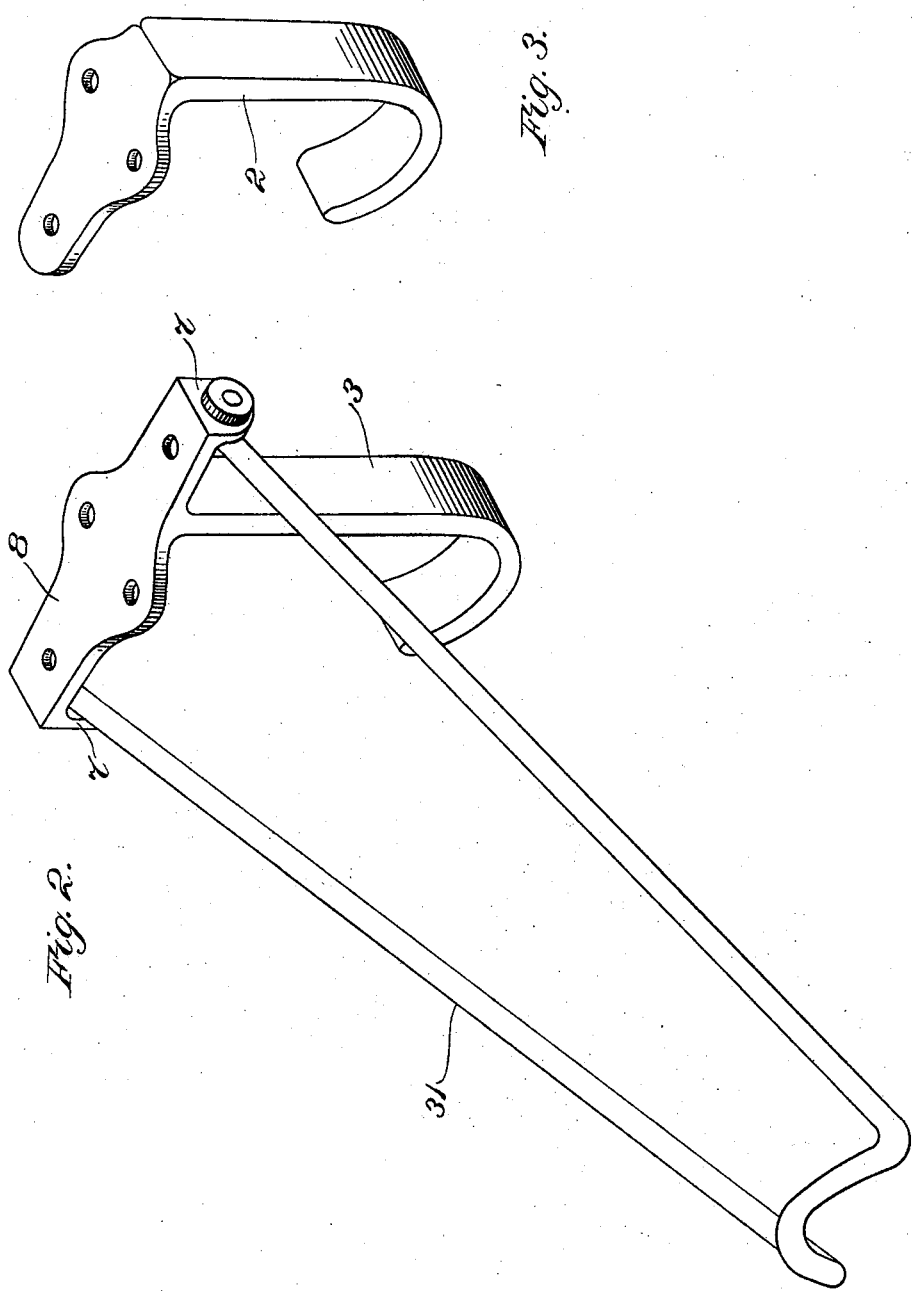
Witnesses.
Oscar F. Hill
Edith J. Anderson.
Inventor:
George H. Williams
by S Macleod Calver Randall
Attorneys.

UNITED STATES PATENT OFFICE.

GEORGE H. WILLIAMS, OF NEWTON, MASSACHUSETTS.

BICYCLE-SUPPORT.

SPECIFICATION forming part of Letters Patent No. 588,542, dated August 17, 1897.

Application filed April 29, 1897. Serial No. 634,352. (No model.)

*To all whom it may concern:*

Be it known that I, GEORGE H. WILLIAMS, a citizen of the United States, residing at Newton, in the county of Middlesex and State of Massachusetts, have invented certain new and useful Improvements in Bicycle-Supports, of which the following is a specification, reference being had therein to the accompanying drawings.

The invention is intended for application to railway-cars in order to facilitate the storing of bicycles therein and to enable them to be transported conveniently and safely.

The question of storing bicycles within railway-cars during transportation thereof is one of very great importance and also presents very serious difficulties. It is necessary to exercise great care in order to avoid injury to the bicycles while they are in the cars, since they are very liable to become broken or scratched, and their size, shape, construction, and proportions are such that they obstruct very seriously the space within a car when stored according to the methods which have been in vogue heretofore. In the past it has been found difficult to keep the enameled parts from becoming scratched and also difficult to avoid breakage, as well as to keep them in the required position and to utilize the storage-space of a car economically and advantageously. A small number of bicycles in a car will take up the space which otherwise would hold a very considerable quantity of ordinary baggage.

In accordance with my present invention I utilize hooks or hangers which are applied to the ceiling of a railway-car and which engage with the rims of the wheels of a bicycle in such manner as to hold the bicycle in inverted position depending from the said ceiling. With the object in view of obviating the tendency of the bicycle to swing or oscillate in response to jars or impulses such as are received during the movement of the car I provide a means of holding the bicycle so as to prevent swinging movements thereof.

The invention will be described first with reference to the accompanying drawings, in which I have illustrated the best practical embodiment of the invention which has yet been contrived by me, and afterward the distinguishing characteristics thereof will be particularly pointed out and distinctly defined in the claim at the close of this specification.

In the said drawings, Figure 1 is a view showing in side elevation the said embodiment of the invention with the bicycle applied thereto. Fig. 2 is a perspective of one of the hooks or hangers of Fig. 1 and the hook or hanger which I apply or use in connection therewith. Fig. 3 is a view showing the other of the hooks or hangers which are represented in Fig. 1. Figs. 4 and 5 are respectively a side elevation and a plan of modified forms of the bail or retainer.

1 designates the ceiling of a car.

2 and 3 are hooks or hangers which are secured to the ceiling 1, with the hooked portions thereof depending and in position to engage with the rims of the wheels of a bicycle. The said hooks or hangers are spaced apart at a distance equal to the length of the tread of a bicycle, so that each thereof may be engaged with the rim of the corresponding wheel of a bicycle, as indicated clearly in Fig. 1, the bicycle hanging in inverted position from the ceiling of the car. In the arrangement which is shown it is contemplated that the hooks or hangers shall be located in line with each other in the direction of the length of the car. In this position the bicycle is out of the way, the entire floor area of the car is left free for the reception of other baggage, and there is no liability of injury to the bicycle.

The swinging movements of the car when in motion would be likely to occasion a lateral swinging movement of the bicycle, which is undesirable. To prevent this, I use a means of restraining the lateral movements of the bicycle, so as to prevent the same from swinging in the manner just mentioned. To this end I use one or more bails or retainers, constructed to engage with one or both of the wheels of the bicycle and hold it from swinging. In the drawings I have shown a retainer in the form of an elongated U-shaped loop or bail 31, the free extremities of which are bent laterally at right angles to form journals to fit into the holes or bearings that are provided therefor in the downwardly-extending ears or lugs 7, which are formed on the base 8 of the hook or hanger 3. The said bail or retainer normally hangs freely below the hook in connection with which it is employed.

In the operation of applying the bicycle to the hooks or hangers after the said bicycle has been inverted and swung upwardly as it is moved into position to engage with the hooks or hangers the wheel thereof which is to be engaged by the bail or retainer comes in contact with the said bail or retainer and pushes the same upwardly sufficiently to allow of the introduction of the rim of the said wheel into the hook or hanger, the bail or retainer remaining in engagement with the wheel. In the reverse operation of removing the bicycle from the hooks or hangers the bail or retainer offers no resistance to the disengagement of the rims of the wheels from the said hooks or hangers. The hook or hanger 3 is made somewhat longer in practice than the hook or hanger 2, in order to compensate for the obstruction which the upper end of the pivoted bail or retainer otherwise would tend to occasion, and thereby facilitate the introduction of the rim and tire of the wheel into the hook or hanger 3 and its removal therefrom. With the object in view of facilitating the entrance of the rim and tire into the said hook or hanger and its removal therefrom the sides of the bail or retainer may, if desired, be bowed or bent upwardly, as shown in Fig. 4, or outwardly, as indicated in Fig. 5. It is not absolutely essential that the side of the bail or retainer which is next adjacent to the opening of hook 3 should be employed, and in practice I contemplate in some cases omitting the same.

I claim as my invention—

The combination with a pair of ceiling-hooks, of a swinging bail or retainer applied in connection with one of the said ceiling-hooks and fitting over the tire of the wheel which is applied to the said ceiling-hook, the said retainer operating to prevent swinging movement of the bicycle, substantially as described.

In testimony whereof I affix my signature in presence of two witnesses.

GEORGE H. WILLIAMS.

Witnesses:
CHAS. F. RANDALL,
WM. A. MACLEOD.